L. Parker,
Cage Trap,
No 29,190.
Patented July 17, 1860.
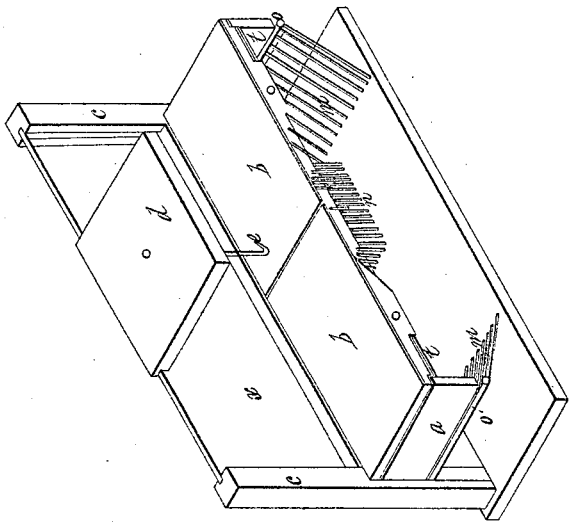
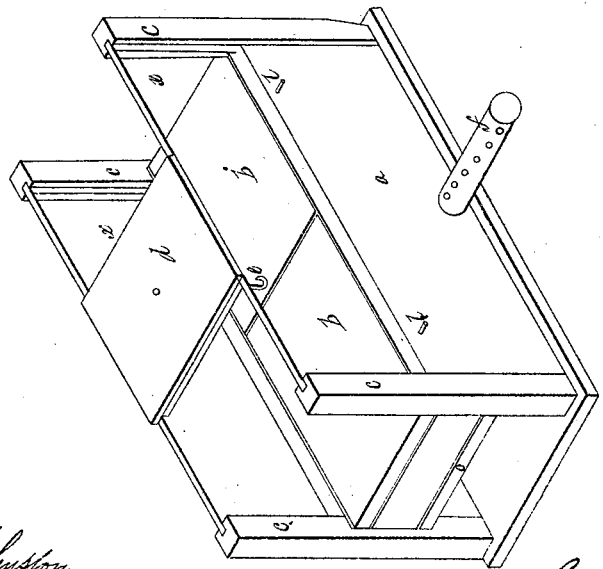
Witnesses:
James J. Johnston
George P. Stock
Inventor:
Leonard Parker

UNITED STATES PATENT OFFICE.

LEONARD PARKER, OF WINTERSET, IOWA.

RAT-TRAP.

Specification of Letters Patent No. 29,190, dated July 17, 1860.

*To all whom it may concern:*

Be it known that I, LEONARD PARKER, of Winterset, Madison county, in the State of Iowa, have invented a new and useful Improvement in Rat-Traps; and I do hereby declare that the following is a full and exact description thereof, reference being had to the accompanying drawings and to the letters of reference marked thereon.

The nature of my invention consists in an arrangement of transparent guards in combination with drop-doors placed on the ordinary rat trap furnished with a conductor or passage which is perforated for the purpose of admitting light into it; the whole being arranged constructed and operated in the manner hereinafter described.

To enable others skilled in the art to make and use my invention, I will proceed to describe its construction and operation.

In the accompanying drawings Figure 1, is a perspective view of the rat trap. Fig. 2, is a sectional view.

($a$) is the case of the ordinary rat trap.

($c$) are uprights used for the purpose of holding the glass ($x$) in position.

($d$) is a top piece to which the bait hook ($e$) is attached.

($b$) are the drop-doors, the journals of which are at ($l$).

($n$) is the bait department or guard, which is placed in the body of the trap and under the drop-doors.

The bars ($o$) and wires ($m$) form the self closing doors of the trap ($a$).

($r$) are cross pieces used for guarding the openings which would be made by the dropping or tilting of the doors ($b$).

($f$) is the conductor or passage which is perforated for the purpose of admitting light into it.

The operation of my improvement is as follows: place bait in the department ($n$) and on the hook ($e$); and connect the trap by means of conductor ($f$) with some suitable arrangement for confining or destroying the rats, placed at some distance from the trap for the purpose of avoiding noise at or near the trap. The rats will enter the trap through the doors consisting of bars ($o$) and wires ($m$), and find themselves imprisoned and seeing light in the conductor ($f$) will enter it and pass on to the arrangement for confining or destroying them. The rats observing the bait on the hook ($e$) through the glass guards will attempt to secure it and will pass on to the drop doors ($b$) which will let them fall into the trap ($a$) and close again, thereby preventing their escape from the trap except by the conductor ($f$).

I am aware that glass and drop-doors have been used in connection with rat-traps; therefore I do not claim the exclusive use of them in the construction of traps, but What I do claim as of my invention is—

The combination of the transparent guards consisting of uprights ($c$) and glass ($x$), drop-doors ($b$) and conducting tube ($f$), when used in connection with the ordinary rat-trap; the whole being combined, arranged, constructed and operated in the manner herein described and for the purpose set forth.

LEONARD PARKER.

Witnesses:
JAMES J. JOHNSTON,
GEORGE P. STECK.